United States Patent
Govindaswamy et al.

(10) Patent No.: US 7,596,277 B2
(45) Date of Patent: Sep. 29, 2009

(54) APPARATUS AND METHOD FOR DETECTING ERROR IN A DIGITAL IMAGE

(76) Inventors: Senthil Govindaswamy, 9931 Paseo Montril, San Diego, CA (US) 92129; Ann C. Irvine, 32088 Taliesin Way, Bonsall, CA (US) 92003; John Ratzel, 12823 Pimpernel Way, San Diego, CA (US) 92129

( * ) Notice: Subject to any disclaimer, the term of this patent is extended or adjusted under 35 U.S.C. 154(b) by 690 days.

(21) Appl. No.: 10/409,296

(22) Filed: Apr. 7, 2003

(65) Prior Publication Data

US 2003/0190078 A1  Oct. 9, 2003

Related U.S. Application Data (60) Provisional application No. 60/456,826, filed on Mar. 21, 2003, provisional application No. 60/371,695, filed on Apr. 9, 2002.

(51) Int. Cl.
G06K 9/36 (2006.01)
G06K 9/46 (2006.01)
H04N 11/02 (2006.01)

(52) U.S. Cl. .................. 382/232; 375/240.27
(58) Field of Classification Search ............ 382/232
See application file for complete search history.

(56) References Cited

U.S. PATENT DOCUMENTS

| | | | | |
|---|---|---|---|---|
| 5,394,406 A | * | 2/1995 | Ono et al. | 714/748 |
| 5,452,104 A | * | 9/1995 | Lee | 358/426.14 |
| 5,731,882 A | * | 3/1998 | Kawamura | 358/426.09 |
| 5,883,958 A | * | 3/1999 | Ishiguro et al. | 705/57 |
| 6,029,265 A | * | 2/2000 | Itoi et al. | 714/755 |
| 6,032,137 A | * | 2/2000 | Ballard | 705/75 |
| 6,049,570 A | * | 4/2000 | Fukunaga et al. | 375/240.12 |
| 6,052,415 A | | 4/2000 | Carr et al. | 375/240 |
| 6,133,859 A | * | 10/2000 | Deygas et al. | 341/67 |
| 6,353,685 B1 | * | 3/2002 | Wu et al. | 382/250 |
| 6,404,817 B1 | * | 6/2002 | Saha et al. | 375/240.27 |
| 6,418,504 B2 | * | 7/2002 | Conway et al. | 710/313 |
| 6,449,378 B1 | * | 9/2002 | Yoshida et al. | 382/100 |
| 6,567,530 B1 | * | 5/2003 | Keronen et al. | 382/100 |
| 6,684,357 B2 | * | 1/2004 | Im | 714/732 |

OTHER PUBLICATIONS

Annex H, ITU-T Draft H.263, (May 2, 1996), Line Transmission of Non-Telephone Signals, Video Coding for Low Bitrate Communication.*

* cited by examiner

*Primary Examiner*—Matthew C Bella
*Assistant Examiner*—Yuzhen Ge (57) ABSTRACT

An apparatus and method for the detection of errors in compressed digital image is disclosed. In one embodiment, a signature is generated using a multiple input shift register and added to the compressed information. The signature is verified at the decoder to detect an error in the compressed information. Other information such as the frame number and/or color component type of the compressed image can also be verified to detect errors in the compressed information. In other embodiments, the decoder detects errors if there are bits remaining after decompression and/or if there are invalid codes at decompression. Once an error is detected, the compressed information can be discarded or re-sent and processed. Therefore, the detection of errors can significantly enhance at least the reliance of systems such as digital cinema that require compression of large amounts of data.

57 Claims, 6 Drawing Sheets

APPARATUS AND METHOD FOR DETECTING ERROR IN A DIGITAL IMAGE

CROSS-REFERENCE TO RELATED APPLICATION

This application claims priority under the benefit of U.S.C. § 120 to Provisional Patent Application No. 60/371,695, filed on Apr. 9, 2002 and Provisional Patent Application No. 60/456,826, filed on Mar. 21, 2003, and said provisional applications are incorporated herein by reference.

BACKGROUND OF THE INVENTION

I. Field of Invention

The invention generally relates to error detection in data compression, and more particularly to error detection in compressed digital image data.

II. Description of the Related Art

Video compression is a key factor of multimedia. An effective digital compression can reduce the cost as well as increase the quality of video displayed in any digital communication systems. One application of the video compression technique is in the motion picture industry.

For several decades, the motion picture industry has depended on the duplication, distribution, and projection of celluloid film for delivering programming material to geographically diverse theaters around the country and the world. To a large extent, the methods and mechanisms for the distribution of film material have remained relatively unchanged. Generally, the current film duplication and distribution process involves generating a master film copy from an exceptional quality camera negative, producing a distribution negative from the master film copy, and producing distribution prints from the distribution negative. Depending on the size of the release or number of copies desired for distributing the film, there may be more intermediate steps or multiple copies produced at each stage. The distribution prints (known as "positives") are then distributed by physical means to various theaters and displayed using a film projector.

Although the distribution process above works, there are inherent limitations. Due to the use of celluloid material for the film and the bandwidth limitations of the film media, there are restrictions on the ability to provide high fidelity multi-channel audio programming. Then, there is the high expense of making a large number of film duplicates, which can cost several hundreds or thousands of dollars for each copy of a feature length film. There is also the expense, complexity, and delay associated with physically distributing large canisters of celluloid film to a large and growing number of theater locations. In addition, this type of film can easily be damaged during use and/or the quality can quickly degrade, thereby impacting the presentation experience.

Accordingly, new and emerging technologies are being developed to provide alternative approaches to the ongoing film distribution problems. One such method is the use of satellite transmission. However, in order to transmit a high quality audio/video (AV) signal in "real-time," the data rate requirement (in bits per second) is on the order of 1.5 billion bits per second. This high data rate requires the capacity equivalent of an entire satellite to transmit even a single program, which is prohibitively expensive. Therefore, satellite transmissions are not yet commercially viable for the distribution of high quality AV material. Moreover, the received information must be displayed using a high quality projector, which has not previously been available. As a result, the implementation of a satellite based transmitter and receiver system would be costly and a radical change from current methods of film distribution and display.

Advances in digital technology have also led to a distribution concept whereby programming material is electronically stored in a digitized format. The digitized images may be distributed on various magnetic media or compact optical discs, or transmitted over wired, fiber optic, wireless, or satellite communication systems. These storage mediums typically have storage capacities ranging from about 4.5 gigabytes (GB) to about 18 GB. However, an average two hour movie having an average image compressed bit rate of about 40 Mbps for the image track and about eight Mbps for audio and control information requires approximately 45 GB of storage space. Thus, even if a high storage capacity DVD-ROM disk is implemented, a two-hour movie requires use of multiple DVD-ROM disks for adequate capacity.

To reduce the data rate requirement for the storage of high quality electronic images, compression algorithms are being developed. One digital dynamic image compression technique capable of offering significant compression while preserving the quality of image signals utilizes adaptively sized blocks and sub-blocks of encoded discrete cosine transform (DCT) coefficient data. This technique will hereinafter be referred to as the adaptive block size discrete cosine transform (ABSDCT) method. The adaptive block sizes are chosen to exploit redundancy that exists for information within a frame of image data. The technique is disclosed in U.S. Pat. No. 5,021,891, entitled "Adaptive Block Size Image Compression Method And System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Discrete Quadtree Transform technique is discussed in U.S. Pat. No. 5,452,104, entitled "Adaptive Block Size Image Compression Method And System," also assigned to the assignee of the present invention and incorporated by reference herein. The systems disclosed in these patents utilize intraframe encoding, wherein each frame of an image sequence is encoded without regard to the content of any other frame.

Technologies such as the ABSDCT compression technique offer the possibility of a "digital cinema" system. Generally defined, digital cinema refers to the electronic distribution and display of high quality film programming which has been converted to or prepared originally in a digital electronic representation for storage, transmission, and display purposes. A digital cinema system would overcome many of the limitations of the current film distribution process. A digital system would not be subject to the quality degradation over time experienced by celluloid film. Further, a digital system may eliminate the theft and illegal duplication of films by allowing implementation of security measures within the digital system itself. Moreover, distribution of film information using a digital electronic format actually increases the potential for rapid, low-cost duplication without quality degradation.

However, a complete digital cinema system has not been developed by the motion picture industry or related arts. In particular, even if film information can adequately be compressed for distribution, due to the large amount of data involved, an error may occur. For example, errors may occur during the compression, storage and/or decompression of the data. Also, errors may occur during transmission of the compressed data. Particularly, for real time delivery of information through wireless transmission, errors may be generated by high levels of interference that exist due to the nature of wireless channels. Because of these errors, portions of compressed data can be distorted, corrupted or even lost. Such errors in data often cause delays or make recovery of the original data difficult. Therefore, an error detection technique is needed to ensure reliability and efficiency of the compressed data information.

SUMMARY OF THE INVENTION

The apparatus and method in accordance with the invention allow error detection in compressed digital image information. More particularly, errors can be detected in specific portions of the compressed digital image information. Accordingly, when errors are detected, for example during decompression, small portions of the compressed digital image information need to be discarded and replaced, or just discarded. Since only the portions with errors can be discarded, the reliability and efficiency of any digital communication using the invention can be increased.

In one embodiment, an apparatus comprises an image compressor configured to compress digital image information. The image compressor comprises an error detection module configured to add an error detection indicator to the compressed digital image information. The error detection indicator may be one or a combination of a signature, a frame number and/or a component type of the digital information.

In another embodiment, an apparatus and method comprises means for compressing digital image information into compressed digital image information; and means for generating and adding an error detection indicator to the compressed digital image information. The apparatus may also comprise means for converting image information into digital image information.

In still another embodiment, an apparatus for compressing digital image comprises transform means for converting digital image information from spatial to frequency domain and generating transform coefficients; means for quantizing the transform coefficients; variable length coding means for compressing the quantized transform coefficients; means for generating at least one error detection indicator for the compressed information; and means for adding the at least one error detection indicator in the compressed information.

In a further embodiment, an apparatus comprises an image decompressor configured to decompress compressed digital image information into decompressed information of the digital image for display. The image decompressor comprises an error detection module configured to detect errors in the decompressed information of the digital image. The error detection module may detect errors using at least one error detection indicator added to the compressed information. The error detection module may also detect errors if there is an invalid code during the decompression or if there are one or more compressed bits remaining after decompressing the compressed information.

In still a further embodiment, an apparatus and method comprises means for decompressing compressed digital image information into decompressed information for display of the digital image; and means for detecting errors in the decompressed information.

In yet a further embodiment, an apparatus for decoding compressed information comprising variable length decoding means for decompressing the compressed information into decompressed information; means for inverse quantizing the decompressed information; means for converting the inverse quantized decompressed information from frequency to spatial domain; and means for detecting errors in the decompressed information using at least one error detection indicator added to the compressed information.

In another embodiment, a method for decoding compressed information comprises variable length decoding the compressed information into decompressed information; detecting errors in the compressed information using at least one error detection indicator added to the decompressed information; inverse quantizing the decompressed information; and converting the inverse quantized decompressed information from frequency to spatial domain.

In yet another embodiment, a storage medium storing digital image information comprises compressed data of the digital image information; and a signature covering at least a portion of the digital image information to enable error detection at decompression of the compressed data. The storage medium may further comprise component type information of the compressed data; and frame number information of the compressed data. The signature may be generated by a multiple input shift register.

BRIEF DESCRIPTION OF THE DRAWINGS

The invention will be described in detail with reference to the following drawings in which like reference numerals refer to like elements, wherein.

DESCRIPTION OF THE INVENTION

Generally, the apparatus and method allows for the detection of errors in digital image information that had been compressed and decompressed. In one embodiment, an encoder adds an error detection indicator to the compressed digital image information to allow detection of errors at a decoder. The error detection indicator used for detecting errors may be, but is not limited to, an image frame number, a component type or a signature generated by a multiple input shift register (MISR). To detect errors, the decoder verifies the frame number, component type or signature at decompression. Errors in data recovered by the decoder can also be detected if there are compressed bits remaining after decompression and/or if there are invalid codes at decompression. The error detection in accordance with the invention significantly increases the reliability of systems using video information compression/decompression and especially in systems using compression/decompression of large amounts of data information. One application of the invention is in the field of digital cinema.

Digital cinema may comprise the electronic generation, compression, encryption, and storage of audio/visual programming, such as motion pictures in theater systems, theaters, theater complexes, and/or presentation systems. Accordingly, the invention is applicable to the presentation of image and/or audio information in a variety of locations such as theaters or theater complexes, outdoor amphitheaters, drive-in complexes, civic auditoriums, schools and specialty restaurants. For purposes of the explanation, the invention will be described with reference to a theater or theater complex. However, those skilled in the art will readily understand that the invention may be applied to other types of locations, systems and fields.

Also, as disclosed herein, the term "program" refers to one or more films for display in cinemas, televisions, and/or many other presentation systems and/or locations. The term "film" refers to a moving picture including, but not limited to, a full or portion of a motion picture, a video clip, a commercial, a drama or a combination thereof. The term "storage medium" refers to one or more storage means comprising high capacity data storage devices such as a digital versatile disk (DVD) or a removable hard drive (RHD). The terms "encryption" refers to any of several means of processing digital data streams of various sources using any of a number of cryptographic techniques to scramble, cover, or directly encrypt digital streams using sequences generated using secret digital values ("keys") in such a way that it is very difficult to recover the original data sequence without knowledge of the secret key values.

Figure 1:
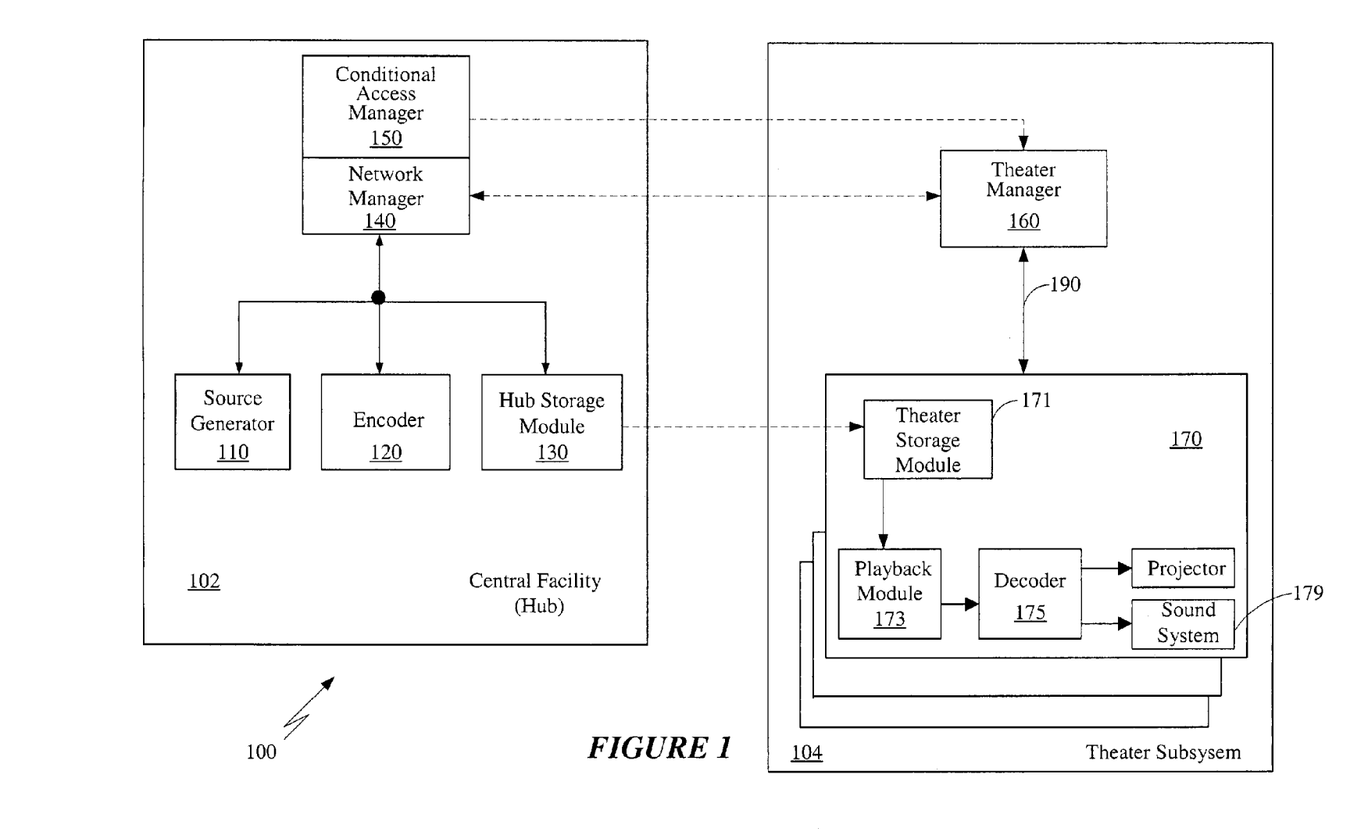
FIG. 1 shows one embodiment of a digital cinema system.

One embodiment of a digital cinema system 100 is illustrated in FIG. 1. The digital cinema system 100 comprises two main systems: at least one central facility or hub 102 and at least one presentation or theater subsystem 104. The hub 102 and the theater subsystem 104 are of a similar design to that of pending U.S. patent application Ser. Nos. 09/564,174 and 09/563,880, both filed on May 3, 2000 and assigned to the same assignee as the present invention.

Generally, the hub 102 comprises a source generator 110 to receive program material and to generate a digital version of a film. The digital information is compressed using a preselected format or process by an encoder 120 and stored on a storage medium 180 by a hub storage module 130. A network manager 140 monitors and sends control information to the source generator 110, the encoder 120, and the hub storage module 130. The digital information may also be encrypted by the encoder 120. In such case, the hub 102 may optionally comprise a conditional access manager 150 to provide specific electronic keying information such that only specific locations, for example theaters, are authorized to show specific programs, at specific times.

In the theater subsystem 104, a theater manager 160 controls one or more auditorium modules 170. Based on control information received from the theater manager 160, a theater storage module 171 transfers compressed information stored on the storage medium 180 to a playback module 173. The playback module 173 receives the compressed information from the theater storage module 171 and prepares the compressed information to a predetermined sequence, size and data rate. The playback module 173 then outputs the compressed information to a decoder 175. At the decoder 175, the compressed information is decrypted (if necessary), decompressed and output to a projector 177 and a sound module 179. Under the control of the theater manager 160, the projector 177 plays the image information on a projection surface and the sound module 179 plays the audio information on a sound system.

It is to be noted that, although the source generator 110 and the encoder 120 are parts of the hub 102 as shown in FIG. 1, either or both the source generator 110 and the encoder 120 can be located in separate facilities such as a film or television production studio. Also, the digital data may be provided to the encoder 120 through a digital camera or any one of several known digital image generation device.

Figure 2:
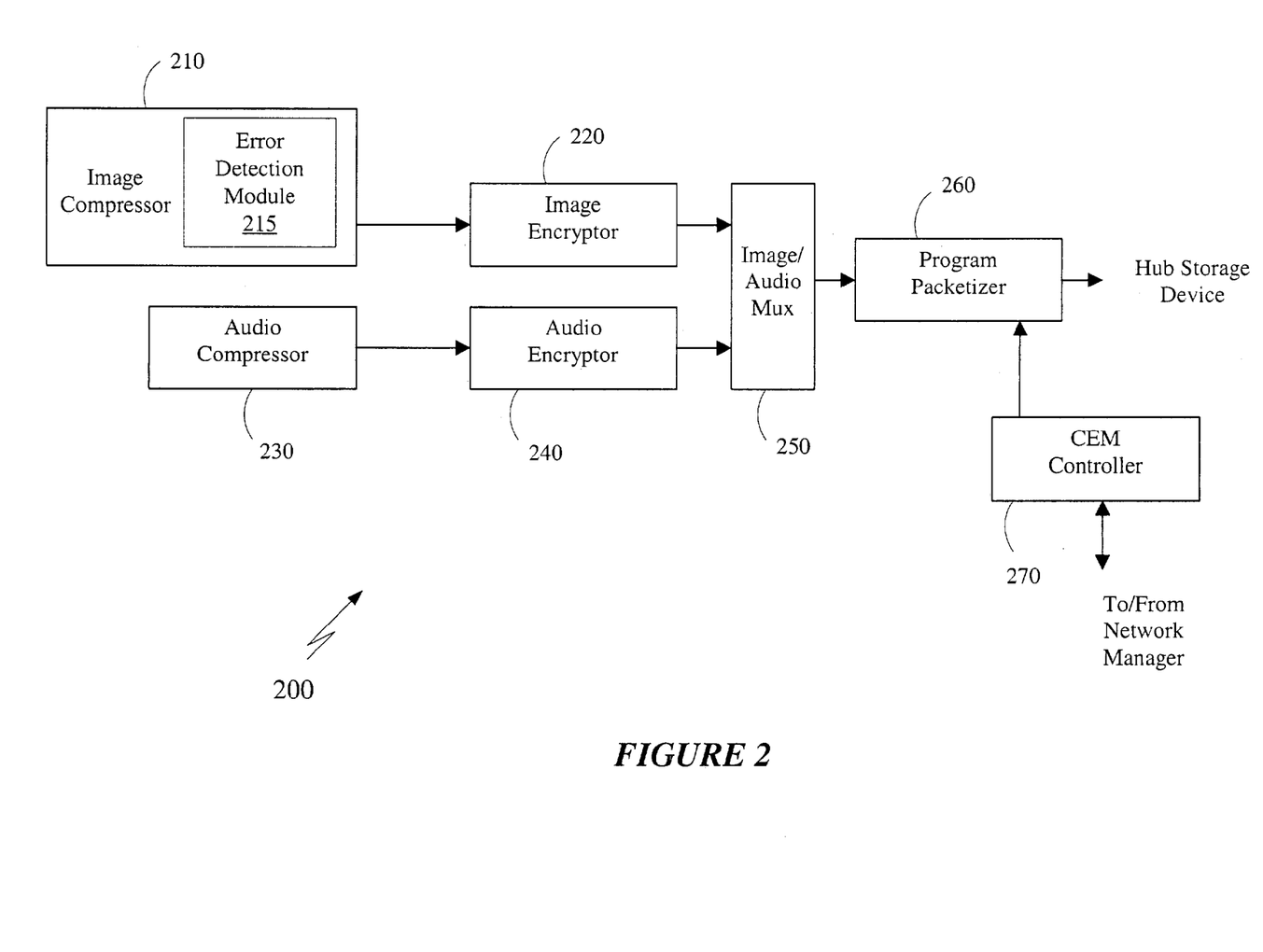
FIG. 2 shows one embodiment of an encoder.

FIG. 2 shows one embodiment of an encoder 200 configured to receive digital information from the source generator 110. The digital image and audio information may be stored in frame buffers (not shown) before further processing. An image compressor 210 is configured to compress the digital image information and the digital audio information is generally passed to an audio compressor 230 for compression. The image compressor 210 and the audio compressor 230 may compress the digital image and audio image information, respectively, using any number of compression techniques. In one embodiment, the image compressor 210 compresses the digital image information and comprises an error detection module 215 configured to add an error detection indicator to the compressed information.

The image compressor 210 may further comprise a signature generator (not shown) such as a multiple input shift register (MISR) to generate the error detection indicator. MISR is a known device using known techniques of using XOR operation on a polynomial and a test pattern to produce a unique code or signature. By using a portion of the digital image information as the test pattern, the MISR generates a signature of that portion of information. The digital image information is then, compressed and the MISR signature is added to the compressed information. At the decoder 175, the MISR signature is reproduced using the same polynomial and the corresponding portion of decompressed information as the test pattern. An error is detected in the portion if the MISR signatures do not match. Here, the portion covered by a signature depends on the structure of the input image data stream.

Typically, the encoder input data stream is composed of image frames. An image frame can generally be divided into slices, a slice can be divided into data blocks, and a data block can be divided into pixels which are the smallest units of an image. Each image frame comprises an integer number of slices and each image slice represents the image information for a set of 16 consecutive scan lines. In such case, each data block corresponds to a 16×16 pixel block across the image of the frame. Also, a frame may be separated into even and odd slices, thereby forming even half frame and odd half frame. In one embodiment, half frames are the fundamental packets of compressed data information that are processed by a decoder. Moreover, an image pixel can be commonly represented in the Red, Green and Blue (RGB) color component system. However, because the human eye is more sensitive to changes in luminance and less sensitive to changes in chrominance, the YCbCr color space is typically used in video compression to represent image pixels. The YCbCr color space is a linear transformation of the RGB components, where Y is the luminance component, and Cb and Cr are the color components. If a frame is separated into even/odd frames, there would be three even half frames and three odd half frames corresponding to the components Y, Cb and Cr.

In the description above, a slice can represent a set of consecutive scan lines other than 16 consecutive scan lines. Also, a different color space with the same or different number of color components may be used to represent an image pixel in accordance with the invention.

The MISR signature may cover one or more data blocks, one or more slices, one or more half frames, or one or more frames of the digital image data. Depending on the MISR signature, errors can be detected in units of block(s), slice(s), half frame(s), frame(s) or other suitable or appropriate units. In another embodiment, the error detection indicator may be a frame number or color component type of the digital image data that is added to the compressed data. In still another embodiment, one or a combination of the frame number, the component type and the MISR signature may be used to detect errors at the decoder 175. The frame number, color component and/or MISR signature can be verified at the decoder 175 to detect errors at decompression of the compressed information as will be described with reference to FIGS. 4 and 5.

Referring back to FIG. 2, the compressed image information may be provided to at least one image encryptor 220 and the compressed audio information may be provided to at least one audio encryptor 240. The image encryptor 220 and the audio encryptor 240 encrypt the compressed image and audio information, respectively, using any of a number of known encryption techniques. For example, each of the image and/or audio program may use specific electronic keying information which authorize theaters or other presentation locations to show a specific program. The keying information can be transmitted or otherwise delivered using a transportable storage element such as a smart card, to the authorized theaters prior to desired playback of the program.

The compressed and optionally encrypted image and audio signals are both presented to a multiplexer 250. At the multiplexer 250, the image and audio information is multiplexed along with time synchronization information to allow the image and audio streamed information to be played back in a time aligned manner at the theater subsystem 104. The multiplexed signal is then processed by a program packetizer 260, which packetizes the data to form the program stream. The packetized image and audio program stream is sent to the hub storage module 130 for storage on the storage medium 180. In another embodiment, the image and audio information may also be treated separately, rather than multiplexed, and separately packetized.

The compressors 210 and 230, the encryptors 220 and 240, the multiplexer 250, and the program packetizer 260 are controlled by a compression/encryption module (CEM) controller 270. The CEM controller 270 communicates with the network manager 140 and is primarily responsible for controlling and monitoring the encoder 200. The CEM controller 270 may be implemented by a software-controlled processor and can be configured as generalized function hardware comprising a variety of programmable electronic devices and/or computers that operate under software and/or firmware program control. The CEM controller 270 may alternatively be implemented using other technologies, such as through one or more ASIC and/or through one or more circuit card assemblies.

Figure 3:
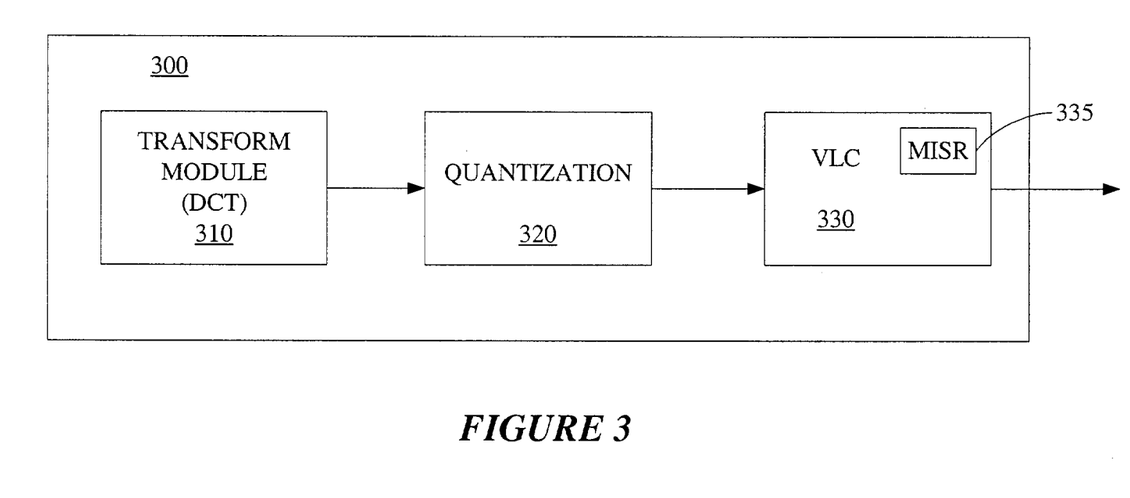
FIG. 3 shows one embodiment of an image compressor.

FIG. 3 shows one embodiment of an image compressor 300 in accordance with the invention. The image compressor 300 comprises a transform module 310, a quantization module 320 and a variable length coding (VLC) module 330. The transform module 310 converts the digitized image information from spatial to frequency domain and generates transform coefficients. The quantization module 320 quantizes the transform coefficients and the VLC 330 compresses the quantized transform coefficients using a variable length coding technique. In one embodiment, the VLC 330 generates an error detection indicator and the error detection module 215 adds the error detection indicator to the compressed information. Here, the error detection indicator may be appended or prepended. The VLC 330 may comprise a signature generator 335 to generate a signature as described above for the error detection indicator. The signature generator 335 may be implemented by a MISR to generate the signature during the compression. In some embodiments, the signature is generated from the quantized transform coefficients before or during the variable length coding. In an alternate embodiment, the signature can be generated after the variable length coding.

The transform module 310 may be a discrete cosine transform (DCT) module which converts a time-sampled signal to a frequency representation of the same signal. For example, the image compressor 300 processes a digital image signal using the adaptive size DCT (ABSDCT) technique described in U.S. Pat. Nos. 5,021,891, 5,107,345 and 5,452,104.

Generally, each of the luminance and chrominance components is passed to a block interleaver (not shown). A 16×16 block is presented to the block interleaver, which orders the image samples within the 16×16 blocks to produce blocks and composite sub-blocks of data for DCT analysis. In one embodiment, one 16×16 DCT is applied to a first ordering, four 8×8 DCTs are applied to a second ordering, 16 4×4 DCTs are applied to a third ordering, and 64 2×2 DCTs are applied to a fourth ordering. The DCT operation reduces the spatial redundancy inherent in the image source. After the DCT is performed, most of the image signal energy tends to be concentrated in a few DCT coefficients.

For the 16×16 block and each sub-block, the transformed coefficients are analyzed to determine the number of bits required to encode the block or sub-block. Then, the block or the combination of sub-blocks which requires the least number of bits to encode is chosen to represent the image segment. For example, two 8×8 sub-blocks, six 4×4 sub-blocks, and eight 2×2 sub-blocks may be chosen to represent the image segment. The chosen block or combination of sub-blocks is then properly arranged in order. The DCT coefficient values may then undergo further processing such as, but not limited to quantization and variable length coding, as shown in FIG. 3.

For example, the DCT coefficients can be quantized using weighting functions optimized for the human eye. Also, in variable length coding of the quantized DCT coefficients, the VLC 330 may comprise a Huffman engine for Huffman coding the non-zero AC coefficient values along with the run length of zeros. Namely, a Huffman code represents the number of zeros preceding a non-zero AC coefficient and the size (minimum number bits required for representation) of that non-zero AC coefficient. Accordingly, the DCT coefficients are run-length coded to generate the different pairs of run lengths of zeros and corresponding size of the subsequent non-zero AC coefficient. Here, zigzag scanning or other scanning patterns can be used to increase the runs of zeros. Tables are then used to assign codes to the different run-length coded pairs based on the probabilities with which the codes occur. Short codes are assigned to pairs which appear more frequently and longer codes to pairs which appear less frequently. The Huffman code is appended with the actual value of the AC coefficient and transmitted.

For coding and decoding, Huffman code tables may be stored in both the encoder 120 and the decoder 175, respectively. Depending on the probability analysis of the information being Huffman coded, one or more Huffman code tables may be used. For example, when using the YCbCr color space, three different Huffman code tables can be used, one for each color component Y, Cb and Cr.

In one embodiment, at the beginning of a component half frame, for example with the header, the Huffman Engine will precede the compressed data with bits that indicate the frame number and component type of the image information. At the end of a component half frame of data, for example within the trailer, the Huffman Engine will add the signature generated by the signature generator 335. This signature may cover information in the half frame, excluding the header. The signature, component type and frame number can be verified at a decoder for error detection.

The compressed information, including one or more error detection indicators, is sent from the hub 102 to the theater subsystem 104. The compressed information may be stored in the hub storage module 130 and physically transported using the storage medium 180. Here, the storage medium 180 comprises the compressed data of the digital image information and at least one error detection indicator to enable error detection at decompression of the compressed data. In one embodiment, the error detection indicator is a signature covering at least a portion of the digital image information. The storage medium may further comprise the component type and the frame number of the compressed data as error detection indicators to enable error detection at decompression of the compressed digital image data. Alternatively, the compressed information or portions thereof may also be transmitted to the theater storage module 171 using many wireless and/or wired transmission methods. The wireless and/or wired transmission of the information compressed allows real time delivery and playback of a film.

When a program is to be viewed, the program information may be retrieved from the theater storage module 171 and transferred to the auditorium module 170 via the theater manager 160. Each auditorium module 170 may process and display a different program from other auditorium modules 170 in the same theater subsystem 104, or one or more auditorium modules 170 may process and display the same program simultaneously.

At the decoder 175, the compressed information received from the theater storage module 171 is decrypted, if necessary, using key information provided to authorized theaters and decompressed using a decompression algorithm that is inverse to the compression algorithm used at the encoder 120. For example, if image compression is based on the ABSDCT algorithm, the decompression process may comprise variable length decoding, IDCT, and DCT block combiner deinterleaving. The decoder 175 converts the decompressed image information to a standard video format used by the projection system (which may be either an analog or digital format) and the image is displayed through an electronic projector 177. The audio information is also decompressed and provided to the auditorium's sound module 179 for playback with the image program. The decoder 175 also detects errors in the compressed information using the error detection indicator therein as will be described with reference to FIGS. 4 and 5. The errors detected by the decoder 175 may be an error that occurred during compression, transmission, or the decompression of data.

Figure 4:
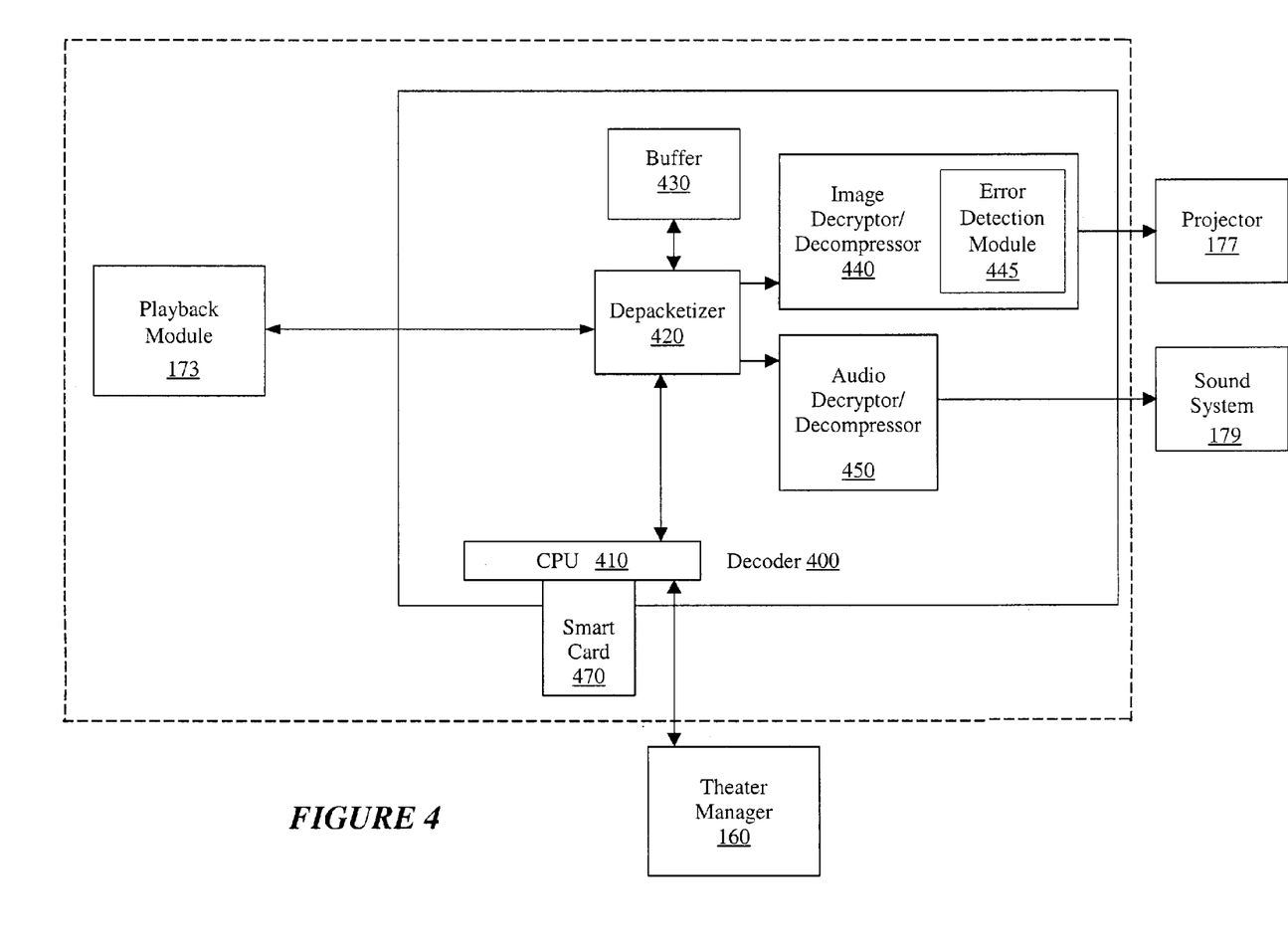
FIG. 4 shows one embodiment of a decoder.

FIG. 4 shows one embodiment of a decoder 400. The decoder 400 is configured to process compressed/encrypted program information to be visually projected onto a screen or surface and audibly presented using a sound system such as the sound module 179. The decoder 400 is controlled by its controller 410 or via the theater manager 160, and may comprise a depacketizer 420, a CPU 410, a buffer 430, an image decryptor/decompressor (DD) 440 and an audio DD 450. A cryptographic smart card 470 may additionally be used which interfaces with controller 410 and/or image DD 440 for transfer and storage of unit-specific cryptographic keying information.

The decoder 400 may be implemented on one or more circuit card assemblies and the circuit card assemblies may be installed in a self-contained enclosure that mounts on or adjacent to the projector 177.

In operation, the buffer 430 may temporarily store information for the depacketizer 420. The depacketizer 420 identifies and separates the individual control, image, and audio packets that arrive from the playback module 173, the CPU 410 and/or the theater manager 160. Control packets may be sent to the theater manager 160 while the image and audio packets are sent to the image and audio DD systems 440 and 450, respectively. Read and write operations tend to occur in bursts. Therefore, large buffers 430 are typically used to stream data smoothly from the depacketizer 420 directly to the projection equipment.

The image DD 440 takes the image data stream from depacketizer 420, performs decryption if necessary, and reassembles the original image for presentation on the screen. The output of this operation generally provides standard analog RGB signals to the digital cinema projector 177. The decryption and decompression can be performed in real-time, allowing for real-time playback of the programming material. The image DD 440 also comprises an error detection module 445 configured to detect errors in the decompressed digital image data.

The processing elements used for decompression may be implemented in dedicated specialized hardware configured for this function such as an ASIC and/or one or more circuit card assemblies. Alternatively, the decompression processing elements may be implemented as standard elements and/or generalized hardware comprising a variety of digital signal processors, programmable electronic devices and/or computers that operate under the control of special function software and/or firmware programming. Multiple ASICs may be implemented to process the image information in parallel to support high image data rates.

Figure 5:
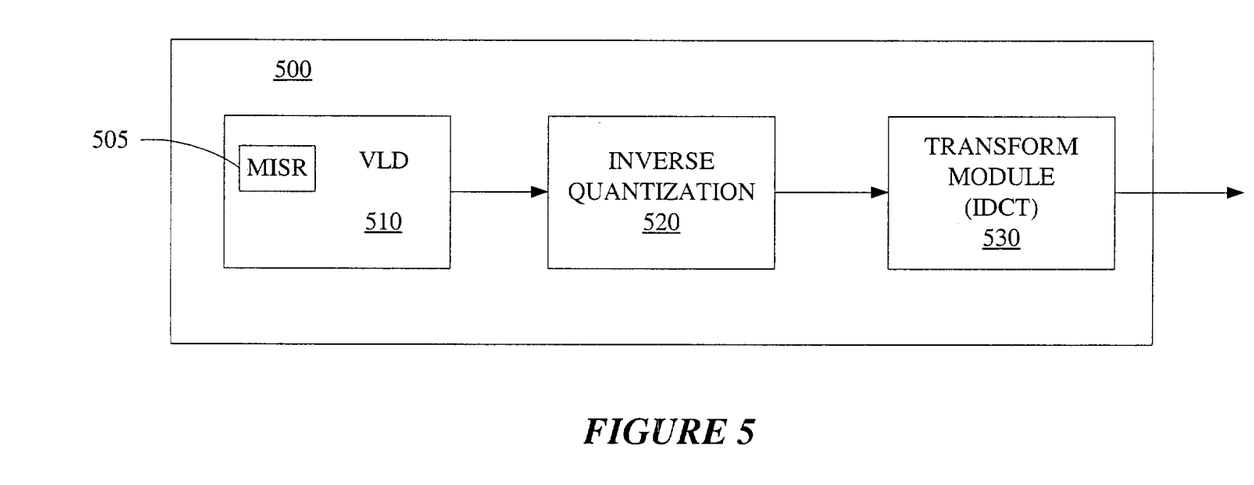
FIG. 5 shows one embodiment of an image decompressor.

At the image DD 440, the image program data streams undergo an image decompression process symmetric to the image compression used in the encoder 120. For example, FIG. 5 shows image decompression processing symmetric to the image compression shown in FIG. 3. The image decompressor 500 as shown in FIG. 5 may comprise a variable length decoding (VLD) module 510 to decompress the compressed information, an inverse quantization module 520 to inverse quantize the decompressed information, and a transform module 530 to convert the inverse quantized decompressed information from frequency to spatial domain to enable display of the digital image.

In one embodiment, the error detection module 445 detects errors in the decompressed information using an error indicator added to the compressed information. As described with reference to the image compressor 210, the error detection indicator added to the compressed information may be one or a combination of the frame number, the component type or the MISR signature. In one embodiment, the VLD module 510 comprises a signature analyzer 515 configured to reproduce a signature for the detection of errors in the compressed information.

During decompression, the error detection module 445 detects errors by periodically verifying one or the combination of the current frame number, component type and MISR signature. Here, the current frame number, component type and signature can be verified at the end of every component half frame. If the frame number, component type and/or MISR signature of the information being decompressed does not correspond to the current frame number, component type and/or MISR signature, respectively, the error detection module 510 detects an error in the decompressed information.

To verify the MISR signature, the VLD module 510 may comprise a signature analyzer 505 configured to generate a control signature from the compressed information. The signature analyzer 505 can be implemented by a MISR to correspond with the signature generator 335 of the encoder 120. Accordingly, the signature analyzer 515 may be implemented to generate the control signature before, during or after the variable length decoding, depending upon whether the MISR signature from the encoder 120 was generated from the quantized transform coefficients or from the variable length coded data. For example, if the signature generator 335 generates the MISR signature from the quantized transform coefficients, the signature analyzer 505 generates the control signature after variable length decoding. However, if the signature generator 335 generates the MISR signature from the variable length coded data, the signature analyzer 505 generates the control signature before or during variable length decoding. Also, the signature analyzer 515 may cover units such as one or more data blocks, one or more slices, one or more half frames, or one or more frames. By comparing the control signature with the MISR signature received with the compressed information, the MISR signature can be verified.

The error detection module 445 may also detect an error if there are one or more compressed bits remaining after decompressing an image frame or segment. In still another embodiment, the error detection module 445 may detect an error if there is an invalid code. For example, when decoding Huffman coded data, an error is detected if a code cannot be found in the Huffman Code Table.

Figure 6:
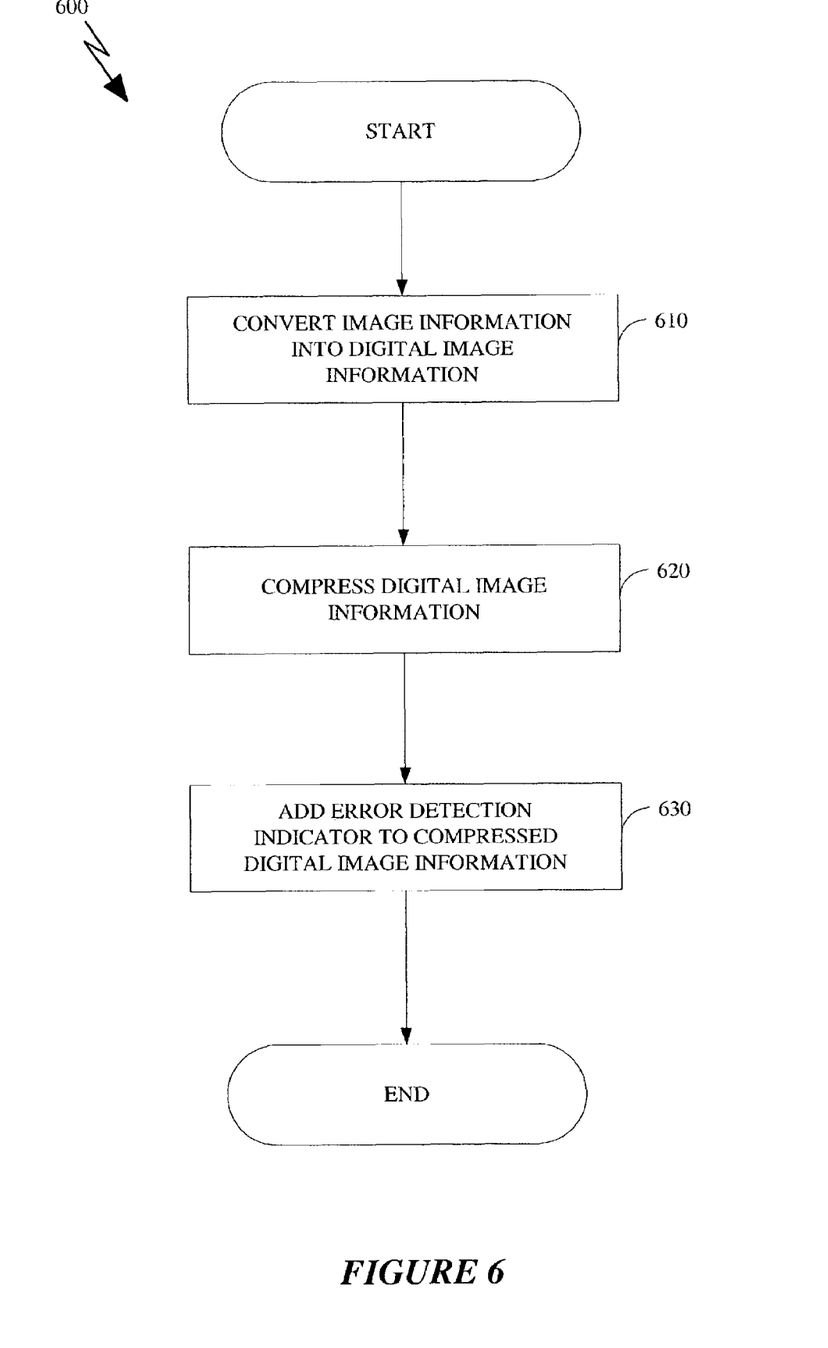
FIG. 6 shows one embodiment of a method for encoding image information.
Figure 7:
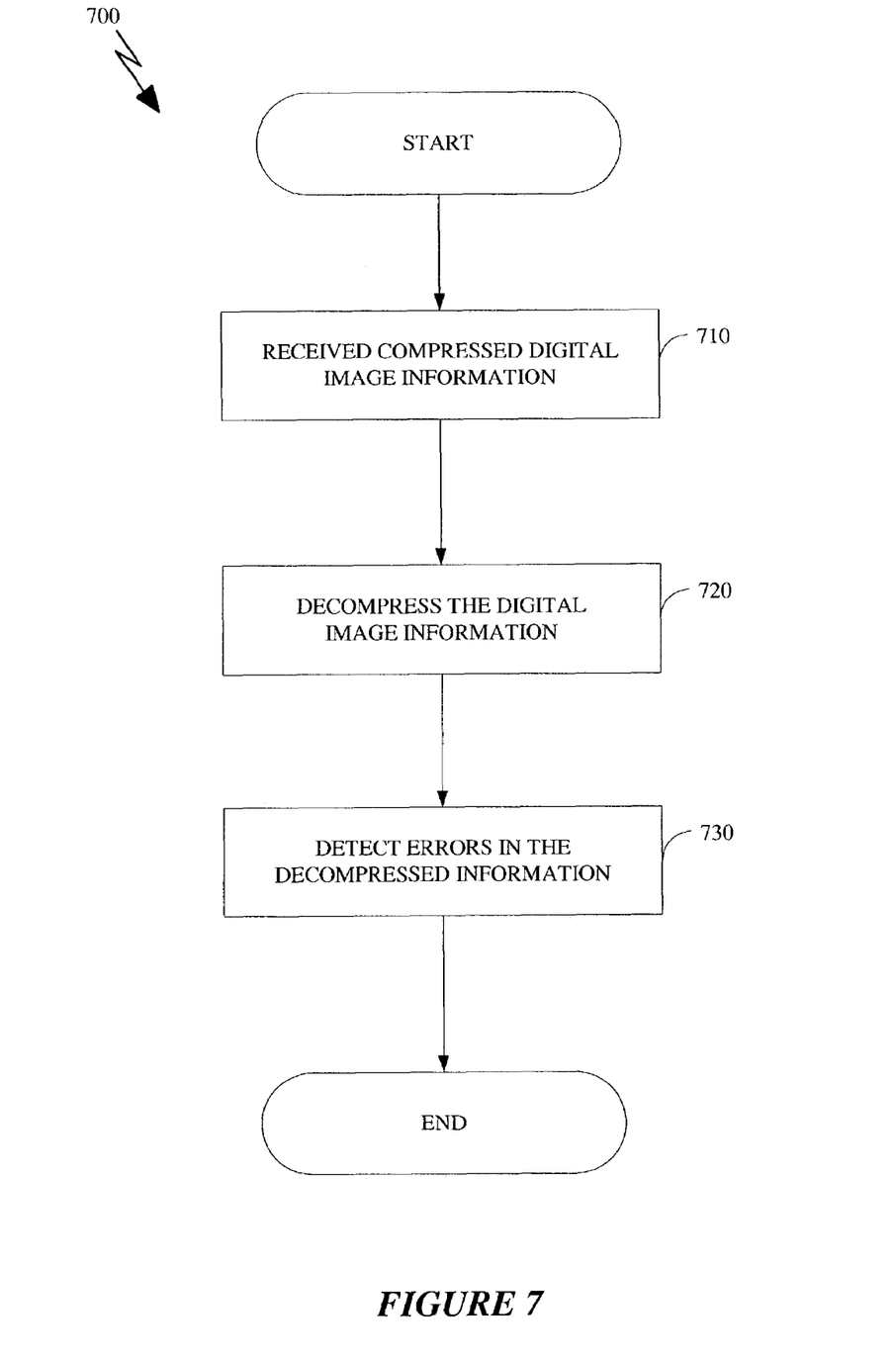
FIG. 7 shows one embodiment of a method for decoding compressed digital image information.

Accordingly, errors are detected in digital image information that is compressed and decompressed using one or a combination of any detection methods described above. FIG. 6 illustrates one embodiment of a method 600 for encoding image information to allow detection of errors and FIG. 7 illustrates one embodiment of a method 700 for decoding compressed digital image information that allows detection of error.

As shown in FIG. 6, the image information is converted into digital image information (610). The digital image information is then compressed (620) and an error detection indicator is added to the compressed digital image information (630). Here, the compression may comprise conversion from spatial to frequency domain to generate transform coefficients, quantization of the transform coefficients, and variable length coding to compress the quantized transform coefficients as described with reference to FIG. 3. The error detection indicator added to the compressed digital image information may be either one or a combination of the frame number, a component type, or a signature also described above. Furthermore, if the image information is already in the digital format, conversion into a digital image form would be omitted.

The compressed digital image information encoded by method 600 is received (710) and decompressed (720) by method 700. The decompression would be a process that is inverse to the compression process. As described with reference to FIG. 5, decompression may comprise variable length decoding to decompress the compressed information, inverse quantization, and conversion from frequency to spatial domain. Here, errors are detected in the decompressed information (block 730). In one embodiment, errors are detected using at least one error detection indicator added to the compressed information. Errors can also be detected if there is an invalid code during the variable length decoding and/or if there are one or more compressed bits remaining after decompressing the compressed information.

Once an error has been detected, the decoder 175 may issue an interrupt such that the portion of the compressed data containing the error can be discarded or re-sent to the theater subsystem 179 depending on the needs of the system. This portion may be one or more data blocks, one or more slices, one or more half frames, one or more frames or a portion corresponding to some time period. The portion may be limited by how the error was detected or may be fixed by the theater subsystem 104. For example, if an error is detected using the frame number, the portion cannot be less than a frame.

The recovered digital image data goes through digital to analog conversion, and the analog signals are output to projector 177. Alternatively, a digital interface may be used to convey the decompressed digital image data to the projector 177 obviating the need for the digital-to-analog process. The audio DD 450 takes the audio data stream from the depacketizer 420, performs decryption, and reassembles the original audio for presentation on a theater's speakers or audio sound module 179. The output of this operation provides standard line level audio signals to the sound module 179. Similar to the image DD 440, the audio DD 450 reverses the operation performed by the audio compressor 230 and the audio encryptor 240 of the hub 102. Using electronic keys from the cryptographic smart card 432 in conjunction with the electronic keys embedded in the data stream, the decryptor 450 decrypts the audio information. The decrypted audio data is then decompressed. Audio decompression is performed with an algorithm symmetric to that used at the central hub 102 for audio compression. As discussed earlier, audio and data tracks may be time synchronized to the image programs or may be presented asynchronously without direct time synchronization.

Image programs may consist of single frames (i.e., still images), a sequence of single frame still images, or motion image sequences of short or long duration. The projector 177 presents the electronic representation of the program on a screen. The sound module 179 presents the audio portion of a program on the theater's speakers.

By packetizing the data, or forming "data blocks," the program stream may be monitored during decompression at the theater subsystem 104 for errors in receiving the blocks during decompression. Requests may be made by the theater manager 160 of the theater subsystem 104 to acquire data blocks exhibiting errors. Therefore, if errors exist, only small portions of the program need to be discarded and/or replaced, rather than an entire program. If portions of the program are to be replaced, requests of small blocks of data may be handled over a wired and/or wireless link. This provides for increased reliability and efficiency.

It should be noted that the foregoing embodiments are merely examples and are not to be construed as limiting the invention. For example, the playback module 173 and the decoder 175 may be integrated into a single playback-decoder module. The encoding may comprise other processes such as frequency weighting and/or differential quad-tree transform. In such cases, the decoding would comprise inverse frequency weighting and/or inverse differential quad-tree transformation. Also, although the signature generator 335 is shown to be a part of the VLC 330, the signature generator can be separately implemented outside the VLC 330. Similarly, the signal analyzer 505 can be separately implemented outside the VLD 510. If the signal generator and analyzer 335 and 505 are implemented by MISRs, one or both the MISRs can be implemented by hardware, software, firmware, or a combination thereof. Furthermore, the error detection modules 215 and 445 may be implemented separately or as part of the VLC 330 and VLD 510, respectively. Moreover, the verification of the current frame number, component type and signature can be at the end of every frame. Additionally, information of the compressed image other than the frame number and component type can also be used for verifying and detecting errors in the compressed information.

Therefore, the description of the invention is intended to be illustrative, and not to limit the scope of the claims. As such, the present teachings can be readily applied to other types of apparatus and many alternatives, modifications, and variations will be apparent to those skilled in the art.

What is claimed is:

1. An apparatus comprising:
an image compressor configured to compress digital image information, the image compressor comprising:
an error detection module configured to add at least one error detection indicator to the compressed digital image information, the at least one error detection indicator comprising a signature generated, over a half frame of said digital image information, by a multiple input shift register, wherein the half frame of the digital image information corresponds to a plurality of even slices or a plurality of odd slices of the total number of slices comprising a frame of the digital image information.

2. The apparatus of claim 1, wherein the image compressor further comprises:
a transform module configured to convert the digital image information from spatial to frequency domain, the transform module configured to generate transform coefficients;
a quantization module coupled to the transform module, the quantization module configured to quantize the transform coefficients; and
a variable length coding module coupled to the quantization module, the variable length coding module configured to compress the quantized transform coefficients and to generate the at least one error detection indicator.

3. The apparatus of claim 2, wherein the at least one error detection indicator comprises the signature of at least the quantized transform coefficients and wherein the variable length coding module comprises the multiple input shift register configured to generate the signature.

4. The apparatus of claim 2, wherein the variable length coding module comprises a Huffman engine to compress the quantized transform coefficients.

5. The apparatus of claim 2, wherein the transform module comprises an adaptive block size discrete cosine transform (ABSDCT) module to convert the digital image information from spatial to frequency domain using ABSDCT.

6. The apparatus of claim 1, wherein the at least one error detection indicator comprises one or a combination of a frame number of the digital image information, a color component type of the digital image information, and a portion of a film.

7. The apparatus of claim 1, further comprising:
an image encryptor configured to encrypt the compressed digital image information.

8. A method comprising:
compressing digital image information into compressed digital image information; and
generating and adding at least one error detection indicator to the compressed digital image information, the at least one error detection indicator comprising a signature generated, over a half frame of said digital image information, by a multiple input shift register, wherein the half frame of the digital image information corresponds to a plurality of even slices or a plurality of odd slices of the total number of slices comprising a frame of the digital image information.

9. The method of claim 8, wherein compressing the digital information comprises:
converting the digital image information from spatial to frequency domain and generating transform coefficients;
quantizing the transform coefficients; and
variable length coding the quantized transform coefficients.

10. The method of claim 9, wherein variable length coding comprises variable length coding in accordance to Huffman coding.

11. The method of claim 9, wherein generating and adding the at least one error detection indicator comprises:
generating the signature of at least the quantized transform coefficients using the multiple input shift register; and
adding the signature as the error detection indicator to the compressed digital image information.

12. The method of claim 11, wherein generating the signature comprises generating the signature of the quantized transform coefficients for at least a half frame of the digital image information.

13. The method of claim 9, wherein converting the digital image information comprises converting the digital image information from spatial to frequency domain using an adaptive size discrete cosine transform.

14. The method of claim 9, wherein the at least one error detection indicator comprises one or both of a frame number of the digital image information and a color component type of the digital image information.

15. An apparatus for compressing digital image comprising:
transform means for converting digital image information from spatial to frequency domain and generating transform coefficients;
means for quantizing the transform coefficients;
variable length coding means for compressing the quantized transform coefficients;
means for generating at least one error detection indicator for the compressed information, the at least one error detection indicator comprising a signature generated, over a half frame of said digital image information, wherein the half frame of the digital image information corresponds to a plurality of even slices or a plurality of odd slices of the total number of slices comprising a frame of the digital image information, by a multiple input shift register; and
means for adding the at least one error detection indicator in the compressed information.

16. The apparatus of claim 15, wherein the means for generating at least one error detection indicator comprises a Huffman engine.

17. The apparatus of claim 15, wherein the at least one error detection indicator comprises the signature of at least the quantized transform coefficients and wherein the means for generating at least one error detection indicator comprises the multiple input shift register configured to generate the signature.

18. The apparatus of claim 17, wherein the means for generating at least one error detection indicator generates either one or a combination of a frame number of the digital image information as an error indicator, a component type of the digital image information as an error indicator, or the signature.

19. The apparatus of claim 15, wherein the transform means comprises an adaptive block size discrete cosine transform (ABSDCT) module to convert the digital image information from spatial to frequency domain using ABSDCT.

20. An apparatus comprising:
an image decompressor configured to decompress compressed digital image information into decompressed information of the digital image for display, the image decompressor comprising:
an error detection module configured to detect one or more errors in a portion of the decompressed information that represents a half frame of the digital image by using at least one error detection indicator that was added to the compressed information during compression of the compressed information, the at least one error detection indicator comprising a signature generated by a multiple input shift register over said portion, wherein the half frame of the digital image corresponds to a plurality of even slices or a plurality of odd slices of the total number of slices comprising a frame of the digital image, the image decompressor further configured to discard the portion of the decompressed information that represents the half frame of the digital image when the one or more errors are detected.

21. The apparatus of claim 20, wherein the image decompressor further comprises:

a variable length decoding module to decompress the compressed information;

an inverse quantization module to inverse quantize the decompressed information; and a transform module to convert the inverse quantized decompressed information from frequency to spatial domain to enable display of the digital image.

22. The apparatus of claim 21, wherein the error detection module detects an error in the decompressed information if there is an invalid code during the decompression by the variable length decoding module.

23. The apparatus of claim 20, wherein the at least one error detection indicator is the signature generated by the multiple input shift register, and the error detection module comprises a signature analyzer to verify the signature to detect errors in the decompressed information.

24. The apparatus of claim 23, wherein the error detection module verifies the signature after each half frame of the compressed information.

25. The apparatus of claim 20, wherein the error detection module detects the errors in the decompressed information by a frame number added to the compressed information.

26. The apparatus of claim 20, wherein the error detection module detects the errors in the decompressed information by a component type added to the compressed information.

27. The apparatus of claim 20, wherein the error detection module detects an error in the decompressed information if there are one or more compressed bits remaining after decompressing the compressed information.

28. The apparatus of claim 20, wherein the compressed information comprises a portion of a film.

29. The apparatus of claim 20, further comprising a decoder that generates an interrupt when an error is detected in said portion of the decompressed image.

30. The apparatus of claim 29, wherein said portion is re-sent to said apparatus based on said interrupt.

31. A method comprising:

decompressing compressed digital image information into decompressed information for display of the digital image;

detecting one or more errors in a portion of the decompressed information that is a half frame of the digital image by using at least one error detection indicator that was added to the compressed information during compression of the compressed information, the at least one error detection indicator comprising a signature generated by a multiple input shift register over said portion, wherein the half frame of the digital image information corresponds to a plurality of even slices or a plurality of odd slices of the total number of slices comprising a frame of the digital image; and discarding the portion of the decompressed information that is the half frame when the one or more errors are detected.

32. The method of claim 31, wherein detecting errors comprises verifying the signature.

33. The method of claim 31, wherein detecting errors comprises detecting errors in the decompressed information by a frame number added to the compressed information.

34. The method of claim 31, wherein detecting errors comprises detecting errors in the decompressed information by a component type added to the compressed information.

35. The method of claim 31, wherein detecting errors comprises detecting an error in the decompressed information if there are one or more compressed bits remaining after decompressing the compressed information.

36. The method of claim 31, wherein detecting errors comprises detecting an error in the decompressed information if there is an invalid code during the decompressing of the compressed information.

37. An apparatus for decoding compressed information comprising:

variable length decoding means for decompressing the compressed information into decompressed information;

means for inverse quantizing the decompressed information;

means for converting the inverse quantized decompressed information from frequency to spatial domain;

means for detecting one or more errors in a portion of the decompressed information that represents a half frame of a digital image by using at least one error detection indicator that was added to the compressed information during compression of the compressed information, the at least one error detection indicator comprising a signature generated by a multiple input shift register over said portion, wherein the half frame of the digital image corresponds to a plurality of even slices or a plurality of odd slices of the total number of slices comprising a frame of the digital image; and means for discarding the portion of the decompressed information that represents the half frame when the one or more errors are detected.

38. The apparatus of claim 37, wherein the means for detecting errors comprises detecting errors using either one or a combination of a frame number as an error detection indicator, a component type as an error detection indicator, or the signature.

39. The apparatus of claim 37, wherein the means for detecting errors detects an error in the decompressed information if there are one or more compressed bits remaining after decompressing the compressed information.

40. The apparatus of claim 37, wherein the means for detecting errors detects an error in the decompressed information if there is an invalid code during the decompression by the variable length decoding means.

41. A method for decoding compressed information comprising:

variable length decoding the compressed information into decompressed information;

detecting one or more errors in a portion of the decompressed information that represents a half frame of a digital image by using at least one error detection indicator that was added to the decompressed information during compression of the compressed information, the at least one error detection indicator comprising a signature generated by a multiple input shift register over said portion, wherein the half frame of the digital image corresponds to a plurality of even slices or a plurality of odd slices of the total number of slices comprising a frame of the decompressed information;

inverse quantizing the decompressed information;

converting the inverse quantized decompressed information from frequency to spatial domain; and discarding the portion of the decompressed information that represents the half frame when the one or more errors are detected.

42. The method of claim 41, wherein detecting errors comprises detecting an error using either one or a combination of a frame number as an error detection indicator, a component type as an error detection indicator, or the signature.

43. The method of claim 41, wherein detecting errors comprises detecting errors in the decompressed information if there are one or more bits remaining after decompressing the compressed information.

44. The method of claim 41, wherein detecting errors comprises detecting errors in the decompressed information if there is an invalid code.

45. An apparatus comprising:

means for compressing digital image information; and means for adding at least one error detection indicator to the compressed digital image information, the at least one error detection indicator comprising a signature generated, over a half frame of said digital image information, by a multiple input shift register, wherein the half frame of the digital image information corresponds to a plurality of even slices or a plurality of odd slices of the total number of slices comprising a frame of the digital image information.

46. The apparatus of claim 45, further comprising:

means for converting image information into digital image information.

47. The apparatus of claim 45, wherein the means for compressing comprises:

means for converting the digital image information from spatial to frequency domain and generating transform coefficients;

means for quantizing the transform coefficients; and variable length coding means for compressing the quantized transform coefficients.

48. The apparatus of claim 47, wherein the variable length coding means comprises the multiple input shift register to generate the signature of at least the quantized transform coefficients as the first error detection indicator.

49. The apparatus of claim 45, wherein the at least one error detection indicator is a frame number of the digital image information.

50. The apparatus of claim 45, wherein the at least one error detection indicator is a component type of the digital image information.

51. An apparatus comprising:

means for decompressing compressed information into decompressed information of the digital image for display;

means for detecting one or more errors in a portion of the decompressed information that represents a half frame of the digital image by using at least one error detection indicator that was added to the compressed information during compression of the compressed information, the at least one error detection indicator comprises a signature generated by a multiple input shift register over said portion, wherein the half frame of the digital image corresponds to a plurality of even slices or a plurality of odd slices of the total number of slices comprising a frame of the digital image; and means for discarding the portion of the decompressed information that represents the half frame of the digital image when the one or more errors are detected.

52. The apparatus of claim 51, wherein the means for detecting errors detects the errors in the compressed information using at least one error detection indicator added to the compressed information.

53. The apparatus of claim 52, wherein the means for detecting errors detects the errors in the decompressed information by a frame number added to the compressed information.

54. The apparatus of claim 52, wherein the means for detecting errors detects the errors in the decompressed information by a component type added to the compressed information.

55. The apparatus of claim 51, wherein the means for detecting errors detects an error in the decompressed information if there are one or more compressed bits remaining after decompressing the compressed information.

56. The apparatus of claim 51, wherein the means for detecting errors detects an error in the decompressed information if there is an invalid code.

57. A computer-readable medium storing code for causing a computer to perform a method comprising:

code for causing a computer to compress digital image information into compressed digital image information; and code for causing a computer to generate and add at least one error detection indicator to the compressed digital image information, the at least one error detection indicator comprising a signature generated, over a half frame of said digital image information, by a multiple input shift register, wherein the half frame of the digital image information corresponds to a plurality of even slices or a plurality of odd slices of the total number of slices comprising a frame of the digital image information.

* * * * *